United States Patent
Hahne et al.

(10) Patent No.: US 7,445,226 B1
(45) Date of Patent: *Nov. 4, 2008

(54) TOW BAR HAVING A SINGLE MOVING PART FOR OPERATIVELY ACCOMMODATING PITCH AND ROLL MOVEMENTS BETWEEN A TOWING VEHICLE AND A TOWED VEHICLE

(75) Inventors: Merton Hahne, Coleridge, NE (US); Mark Penlerick, Wayne, NE (US); Anthony Crippen, Pender, NE (US)

(73) Assignee: Automatic Equipment Manufacturing Company, Pender, NE (US)

( * ) Notice: Subject to any disclaimer, the term of this patent is extended or adjusted under 35 U.S.C. 154(b) by 465 days.

This patent is subject to a terminal disclaimer.

(21) Appl. No.: 11/272,337

(22) Filed: Nov. 14, 2005

Related U.S. Application Data

(62) Division of application No. 10/840,033, filed on May 7, 2004, now Pat. No. 6,991,247.

(51) Int. Cl.
*B60D 1/54* (2006.01)
(52) U.S. Cl. .................... 280/493; 280/491.3
(58) Field of Classification Search ................. 280/493, 280/494, 495, 491.1, 491.3, 491.4, 504, 511, 280/512, 513
See application file for complete search history.

(56) References Cited

U.S. PATENT DOCUMENTS

| | | | |
|---|---|---|---|
| 1,185,435 A | 5/1916 | Powell | |
| 1,229,465 A | 6/1917 | Hudson | |
| 1,422,129 A | 7/1922 | Reuse | |
| 1,557,841 A | 10/1925 | Holmes | |
| 1,730,077 A | 10/1929 | Isachsen | |
| 2,027,499 A | 1/1936 | Tully | 280/33.44 |
| 2,071,883 A | 2/1937 | Hodny | 88/98 |
| 2,120,422 A | 6/1938 | Williams et al. | 280/33.44 |
| 2,133,065 A | 10/1938 | Weber | 280/33.15 |
| 2,139,970 A | 12/1938 | Moore | 280/33.44 |
| 2,440,877 A | 5/1948 | Russell | 280/33.14 |
| 2,457,885 A | 1/1949 | Gatch | 280/33.15 |
| 2,486,483 A | 11/1949 | Landen | 55/84 |
| 2,522,793 A | 9/1950 | Koeckritz | 280/33.55 |
| 2,664,300 A | 12/1953 | Danielson et al. | 280/486 |
| 2,746,771 A | 5/1956 | Gross | 280/494 |
| 2,795,435 A | 6/1957 | Ortiz et al. | 280/446 |

(Continued)

FOREIGN PATENT DOCUMENTS

CA   844457   7/1970   ................. 280/42

(Continued)

*Primary Examiner*—Tony H. Winner
(74) *Attorney, Agent, or Firm*—Donald R. Schoonover

(57) ABSTRACT

A tow bar for connecting a towed vehicle to a towing vehicle, the tow bar comprising a towing vehicle connection mechanism connected to the towing vehicle; a towed vehicle connection mechanism connected to the towed vehicle; and an interconnecting mechanism connecting the towing vehicle connection mechanism to the towed vehicle connection mechanism. The interconnecting mechanism defines an interconnection central point and an interconnection vertical axis spaced rearwardly from the interconnection central point. The interconnecting mechanism is structured to accommodate substantially all pitch and roll movements between the towing and towed vehicles at and about the interconnection central point, and to accommodate substantially all yaw movements between the towing and towed vehicles at and about the interconnection vertical axis.

10 Claims, 5 Drawing Sheets

U.S. PATENT DOCUMENTS

| | | | | |
|---|---|---|---|---|
| 2,871,030 A | 1/1959 | Hollis | | 280/492 |
| 2,916,301 A | 12/1959 | Cushman | | 280/491 |
| 3,000,652 A | 9/1961 | Hawkins | | 280/406 |
| 3,019,033 A | 1/1962 | Wegener et al. | | 280/482 |
| 3,281,162 A | 10/1966 | Carson | | 280/478 |
| 3,384,391 A | 5/1968 | Batke | | 280/478 |
| 3,492,022 A | 1/1970 | Hansen | | 280/478 |
| 3,572,765 A | 3/1971 | Tieben | | 280/491 |
| 3,649,048 A | 3/1972 | Garnett | | 280/477 |
| 3,679,231 A | 7/1972 | Derr, Jr. | | 280/406 A |
| 3,730,557 A | 5/1973 | Cox | | 280/504 |
| 3,740,074 A | 6/1973 | Coil | | 280/402 |
| 3,794,355 A | 2/1974 | Cracolice | | 280/482 |
| 3,806,162 A | 4/1974 | Milner | | 280/502 |
| 3,829,131 A | 8/1974 | Moore, Jr. | | 280/493 |
| 3,843,164 A | 10/1974 | Flegel | | 280/492 |
| 3,848,890 A | 11/1974 | MacAlpine | | 280/204 |
| 3,938,830 A | 2/1976 | Lane | | 280/493 |
| 3,947,062 A | 3/1976 | Pierce | | 293/69 R |
| 3,998,471 A | 12/1976 | Lutchemeier | | 280/494 |
| 4,073,508 A | 2/1978 | George et al. | | 280/478 R |
| 4,200,306 A | 4/1980 | Helms | | 280/494 |
| 4,326,730 A | 4/1982 | Tomen | | 280/502 |
| 4,548,423 A | 10/1985 | Craven | | 280/492 |
| 4,588,199 A | 5/1986 | Fisher | | 280/204 |
| 4,603,874 A | 8/1986 | Merrill | | 280/402 |
| 4,640,523 A | 2/1987 | Wolmarans | | 280/491 D |
| 4,711,461 A | 12/1987 | Fromberg | | 280/494 |
| 4,714,264 A | 12/1987 | Woestelandt | | 280/456 R |
| 4,727,949 A | 3/1988 | Rea et al. | | 180/9.32 |
| 4,768,803 A | 9/1988 | Hewitt et al. | | 280/462 |
| 4,856,805 A | 8/1989 | Davis | | 280/491.4 |
| 4,861,061 A | 8/1989 | Frantz | | 280/479.2 |
| 4,869,521 A | 9/1989 | Johnson | | 280/491.1 |
| 5,000,473 A | 3/1991 | Johnson | | 280/491.1 |
| 5,071,153 A | 12/1991 | Duncan | | 280/491.4 |
| 5,088,754 A | 2/1992 | Skelton | | 280/491.3 |
| 5,112,074 A | 5/1992 | Smith | | 280/483 |
| 5,186,483 A | 2/1993 | Sheppard | | 280/494 |
| 5,224,960 A | 7/1993 | Duncan | | 280/491.4 |
| 5,232,240 A | 8/1993 | Johnson | | 280/491.5 |
| 5,308,100 A | 5/1994 | Heider et al. | | 280/474 |
| 5,316,330 A | 5/1994 | Bergeron | | 280/477 |
| 5,346,243 A | 9/1994 | Boeck | | 280/478.1 |
| 5,356,166 A | 10/1994 | Hahne et al. | | 280/491.4 |
| 5,516,140 A | 5/1996 | Hinte | | 280/494 |
| RE35,482 E | 3/1997 | Johnson | | 280/491.5 |
| 5,765,851 A | 6/1998 | Parent | | 280/491.4 |
| 5,873,595 A | 2/1999 | Hinte | | 280/504 |
| 5,909,887 A | 6/1999 | Hobrath | | 280/32.7 |
| 6,168,182 B1 | 1/2001 | Ford | | 280/494 |
| 6,502,847 B1 | 1/2003 | Greaves | | 280/494 |
| 6,612,604 B2 | 9/2003 | Greaves | | 280/494 |
| 6,991,247 B1 * | 1/2006 | Hahne et al. | | 280/493 |
| 7,032,919 B1 * | 4/2006 | Hahne et al. | | 280/493 |
| 7,125,031 B1 * | 10/2006 | Schoonover | | 280/293 |

FOREIGN PATENT DOCUMENTS

| | | | | |
|---|---|---|---|---|
| CA | 1171112 | 7/1974 | | 280/141 |
| GB | 725339 | 3/1955 | | |
| SE | 153309 | 1/1952 | | |
| SU | 269114 | 1/1971 | | 280/491.4 |

\* cited by examiner

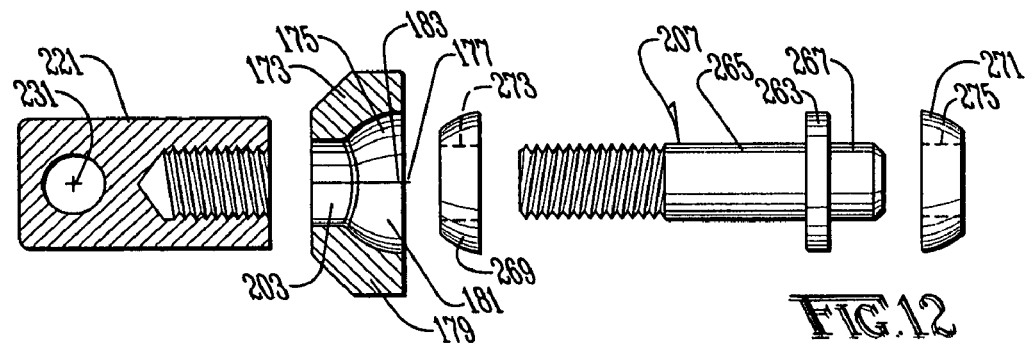
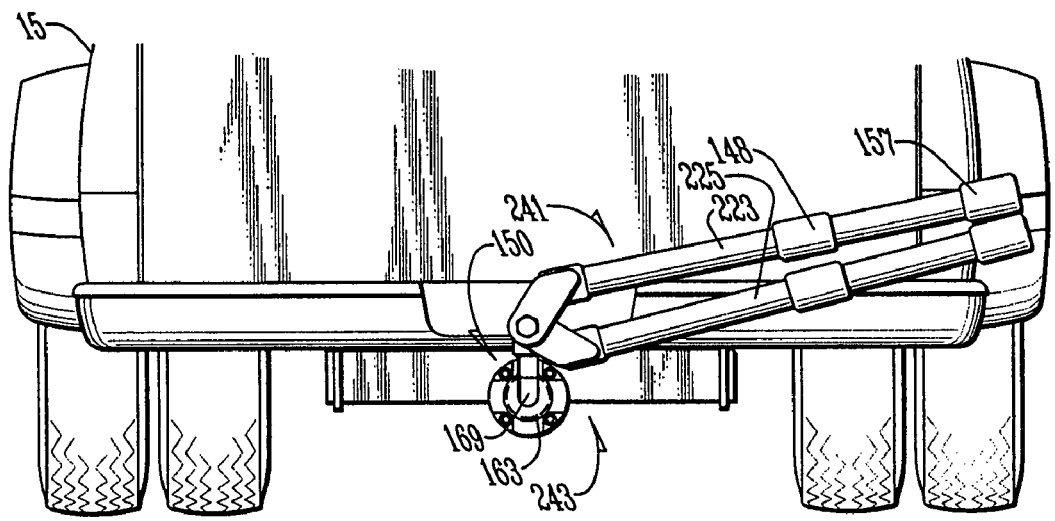

TOW BAR HAVING A SINGLE MOVING PART FOR OPERATIVELY ACCOMMODATING PITCH AND ROLL MOVEMENTS BETWEEN A TOWING VEHICLE AND A TOWED VEHICLE

CROSS REFERENCE TO RELATED APPLICATIONS

This application is a divisional application of U.S. application Ser. No. 10/840,033 filed May 7, 2004, now U.S. Pat. No. 6,991,247. U.S. application Ser. No. 10/910,543 filed Aug. 4, 2004, now U.S. Pat. No. 7,032,919 is a continuation-in-part application of U.S. application Ser. No. 10/840,033 filed May 7, 2004, now U.S. Pat. No. 6,991,247.

BACKGROUND OF THE INVENTION

1. Field of the Invention

The present invention is related to accessories for vehicles and, more specifically without limitation, to an apparatus for towing a vehicle behind another vehicle.

2. Discussion of the Related Art

There is an ever-increasing need to be able to tow a driverless vehicle behind another vehicle. One common situation where this need arises occurs for persons traveling in a motorhome. Most motorhomes are too large to conveniently visit many sites of interest near an overnight stop-over. As a result, many motorhome users tow a small automobile behind their motorhome so the small automobile can be used for local transportation after the motorhome has been parked.

Various devices are used for towing a vehicle, sometimes referred to herein as a towed vehicle, behind another vehicle, sometimes referred to herein as a towing vehicle. One such device is commonly referred to as a dolly. A dolly is generally a two-wheeled vehicle with a tongue that connects to a trailer hitch, such as a ball-type hitch, fixedly connected to the rear of the towing vehicle. To tow a vehicle with the dolly, the vehicle to be towed is driven up behind the dolly and, by use of a small ramp-like arrangement, onto the dolly so the front wheels of the towed vehicle are supported by the dolly. The front wheels are then securely clamped to the dolly, such as with chains and turnbuckles, or other suitable clamping arrangement. When the towing vehicle is driven forward, the dolly follows the towing vehicle by virtue of the connection between the dolly and the trailer hitch of the towing vehicle, and the towed vehicle follows the dolly by virtue of the front wheels of the towed vehicle being supported by and clamped to the dolly.

A major drawback with the use of a dolly occurs when it becomes necessary to back up the tandem assemblage consisting of the towing vehicle connected to the dolly connected to the towed vehicle. The towing vehicle has a first set of wheels mounted on a front axle and a second set of wheels mounted on a rear axle. The dolly has a third set of wheels mounted on an axle, which constitutes a third axle spaced rearwardly from the two axles of the towing vehicle. The towed vehicle has a fourth set of wheels mounted on its rear axle, which constitutes a fourth axle spaced further rearwardly from the two axles of the towing vehicle and from the axle of the dolly. To operatively and simultaneously manipulate those four axles, each having a pair of wheels in contact with the ground therebeneath, such as when the tandem assemblage needs to be backed up, is a very difficult task even for an experienced driver. Of course, the towed vehicle could be unchained and unloaded from the dolly and individually driven out of the way, the dolly disconnected from the towing vehicle and physically placed out of the way, and the towing vehicle could then be backed up as needed. Obviously, such extra time and effort to simply back up the towing vehicle would be bothersome and aggravating, to say the least.

Another device that is commonly used to tow a driverless vehicle behind another vehicle is a tow bar. Tow bars are readily available in many different forms. Tow bars usually have either a socket at the forward end thereof for connecting to a ball-type hitch fixedly connected to the rear of the towing vehicle, or a square-shaped forwardly-extending tube for connecting to a conventional receiver hitch fixedly connected to the rear of the towing vehicle. In addition, tow bars usually have two towbar arms extending rearwardly to connect to the front end of a towed vehicle to thereby form a triangularly-shaped arrangement between the two towbar arms and the front end of the towed vehicle.

One such tow bar is disclosed in U.S. Pat. No. RE35,482 issued Mar. 25, 1997 to Andrew B. Johnson. The Johnson tow bar includes a forwardly-extending hitch tube for connecting to a conventional receiver hitch of a towing vehicle. A roll axis is defined by a fore-to-aft oriented pin pivotally connecting a rearwardly-directed yoke to a plate attached to the hitch tube. A pivot block, spaced rearwardly from the fore-to-aft oriented pin, has a horizontally-oriented throughbore oriented perpendicularly to the fore-to-aft oriented pin. A pitch axis is defined by a pin passing through the horizontally-oriented throughbore of the pivot block, which pivotally connects the pivot block to the yoke. The pivot block also has a vertical-oriented throughbore spaced rearwardly from the horizontal-oriented throughbore of the pivot block. A yaw axis is defined by a bolt passing through the vertically-oriented throughbore of the pivot block, which pivotally connects the pivot block to the forward ends of a pair of towbar arms. The rear end of each towbar arm includes a pivot arm for swinging around rearwardly to connect to a towed vehicle, or for swinging around forwardly to lock alongside the respective towbar arm for storage purposes. The Johnson tow bar can be pivoted upwardly about the horizontally-oriented pin through the pivot block for storage on the rear of the towing vehicle.

One problem with the Johnson tow bar is the plurality of moving parts thereof. Each of those moving parts are operatively subjected to substantial wear and abuse and therefore failure during use, namely, the fore-to-aft oriented pin, which is subjected to constant relative movement between the yoke and the plate attached to the hitch tube; the horizontally-oriented pin, which is subjected to constant relative movement between the pivot block and the yoke; and the vertically-oriented pin, which is subjected to constant relative movement between the towbar arms and the pivot block.

Another problem with the Johnson tow bar is the spaced-apart configuration of the various articulation axes thereof; more specifically, accommodation of roll, pitch and yaw movements between the towing vehicle and the towed vehicle are confined to separately-defined and spaced-apart axes: the fore-to-aft oriented pin through the rearwardly-directed yoke for roll movements, the horizontally-oriented pin through the rearwardly-directed yoke and the pivot block for pitch movements, and the vertically-oriented pin through the pivot block and the forward ends of the towbar arms for yaw movements. The cause for concern in regard to the spaced-apart structuring of the articulation axes of the Johnson tow bar arises from moments that are operatively created in the tow bar, which moments can only be countered internally within the tow bar by pitting one part of the tow bar against another part of the tow bar. Moments which must be countered internally within the tow bar increase wear and tear of those tow bar parts and, as a result, decrease the meantime before failure of the tow bar. More specifically, in the structure of the Johnson tow bar, the yaw axis is spaced rearwardly from the pitch axis which, in turn, is spaced rearwardly from the roll axis which, in turn, is spaced vertically from the fore-to-aft axis of the receiver hitch.

Various force components are imposed by the towed vehicle on the vertical pin through the pivot block, the yaw axis, by virtue of the towed vehicle being connected to the vertically-oriented pin by the towbar arms. For example, in any turning situation where the towed vehicle is not lined up rearwardly from the towing vehicle, the towed vehicle causes the towbar arms to impose a horizontal, transverse force component on the vertically-oriented pin through the pivot block. Although the yaw axis at that vertically-oriented pin of the Johnson tow bar can accommodate the transverse force components imposed thereon by the towed vehicle and the towbar arms, those transverse force components are, in turn, imposed on the vertically-oriented pin through the pivot block, and there is no other structure spaced forwardly therefrom that can provide another yaw axis to accommodate the transverse force components imposed on the vertically-oriented pin. The same reasoning applies whether the transverse force components are to the left or to the right—in other words, all turning situations.

Similarly, in any operative situation where the towing vehicle enters an upgrade or a downgrade before the towed vehicle enters that grade change or the wheels of the towing vehicle are momentarily supported on a plane that is at a different elevation than the plane supporting the wheels of the towed vehicle, the towed vehicle causes the towbar arms to impose a vertical force component on the vertically-oriented pin through the pivot block, which vertical force component is transferred to and accommodated by the pitch axis at the horizontally-oriented pin through the pivot block. However, there is no other structure spaced forwardly from the horizontally-oriented pin through the pivot block that can provide another pitch axis to accommodate the vertical force components imposed on the horizontally-oriented pin through the pivot block. The same reasoning applies whether the vertical force components are upwardly or downwardly—in other words, all pitch situations.

Finally, at all operative times, the towed vehicle causes the towbar arms to impose fore-to-aft force components or aft-to-fore force components on the vertically-oriented pin through the pivot block, such as when the towing vehicle and towed vehicle are speeding up, slowing down, going up or down an incline, or just cruising. The fact that the fore-to-aft oriented pin through the rearwardly-directed yoke is not aligned with the fore-to-aft oriented axis of the receiver hitch of the towing vehicle, such constantly varying fore-to-aft force components imposed by the towed vehicle and the towbar arms, create moments that must be countered internally by the plate attached to the hitch tube and by the connection of the fore-to-aft oriented pin to that plate. The magnitude of the lever arm of that moment would be the spacing between the orifice through the rearwardly-directed yoke for the fore-to-aft oriented pin and the receiver hitch of the towing vehicle.

In addition to the moments created in the fore-to-aft pin and the plate connecting that pin to the hitch tube by fore-to-aft force components, other moments which the Johnson tow bar must internally oppose from force components imposed on the tow bar by the towed vehicle and the towbar arms can be described as follows:

(a) transverse force components create (i) moments in the pivot block with the magnitude of the lever arm thereof being determined by the spacing between the vertically-oriented and horizontally-oriented pins through the pivot block, (ii) moments in the rearwardly-directed yoke with the magnitude of the lever arm thereof being determined by the spacing between the vertically-oriented pin through the pivot block and the orifice through the rearwardly-directed yoke for the fore-to-aft oriented pin, and (iii) moments in the fore-to-aft oriented pin and the plate attached to the hitch tube with the magnitude of the lever arm thereof being determined by the spacing between the vertically-oriented pin through the pivot block and the hitch tube; and (b) vertical force components create (i) moments in the rearwardly-directed yoke with the magnitude of the lever arm thereof being determined by the spacing between the horizontally-oriented pin through the pivot block and the orifice through the rearwardly-directed yoke for the fore-to-aft oriented pin, and (ii) moments in the fore-to-aft oriented pin and the plate attached to the hitch tube with the magnitude of the lever arm thereof being determined by the spacing between the horizontally-oriented pin through the pivot block and the hitch tube.

Another Shortcoming of the Johnson Tow Bar

Of course, the various parts of the Johnson tow bar could be constructed much more massively to enhance the strength thereof in an attempt to more capably withstand the moments created internally within the tow bar due to the spaced-apart structuring of the yaw, pitch and roll axes. Unfortunately, such over-construction would defeat the ability to provide a relatively light-weight, easily manageable tow bar having the structure disclosed by Johnson.

Another such tow bar is disclosed in U.S. Pat. No. 5,765,851 issued Jun. 16, 1998 to Richard A. Parent. The Parent tow bar includes a forwardly-extending hitch member for connecting to a conventional receiver hitch fixedly connected to the rear of a towing vehicle. A pitch axis is defined by a horizontal transversely-oriented bolt, which connects a forwardly-directed yoke to the hitch member. A roll axis is defined by a fore-to-aft oriented bolt, which connects the forwardly-extending yoke to a rearwardly-extending yoke. A yaw axis is defined by a vertically-oriented bolt, which connects the rearwardly-directed yoke to the forward ends of a pair of towbar arms. The rear end of each towbar arm is connected to a towed vehicle.

As with the Johnson tow bar, one problem with the Parent tow bar is the plurality of moving parts thereof. Each of those moving parts is operatively subjected to substantial wear and abuse and therefore failure during use, namely, the horizontal transversely-oriented bolt, which is subjected to constant relative movement between the forwardly-directed yoke and the hitch member; the fore-to-aft oriented bolt, which is subjected to constant relative movement between the forwardly-directed yoke and the rearwardly-directed yoke; and the vertically-oriented bolt which is subjected to constant relative movement between the rearwardly-directed yoke and the towbar arms.

Also as with the Johnson tow bar, another problem with the Parent tow bar is the spaced-apart configuration of the various articulation axes thereof; more specifically, accommodation of pitch, roll and yaw movements between the towing vehicle and the towed vehicle are confined to separately-defined and spaced-apart axes: the horizontally-oriented pin through the hitch member and the forwardly-directed yoke for pitch movements, the fore-to-aft oriented pin through the forwardly-directed and rearwardly-directed yokes for roll movements, and the vertically-oriented pin through the rearwardly-directed yoke and the forward ends of the towbar arms for yaw movements.

As hereinbefore explained, the cause for concern in regard to the spaced-apart structuring of the articulation axes of the Parent tow bar arises from moments that are operatively created in the tow bar, which moments can only be countered internally within the tow bar by pitting one part thereof against another part thereof. Again, moments which must be countered internally within the tow bar by various parts of the tow bar increase wear and tear of those parts and, as a result, decrease the meantime before failure of the tow bar. In the structure of the Parent tow bar, the yaw axis is spaced rearwardly from the roll axis which, in turn, is spaced rearwardly from the pitch axis which, in turn, is spaced rearwardly from the receiver hitch of the towing vehicle.

Various force components are imposed by the towed vehicle on the vertically-oriented bolt through the rearwardly-directed yoke, the yaw axis, by virtue of the towed vehicle being connected to the vertically-oriented bolt by the towbar arms. For example, in any turning situation, the towed vehicle causes the towbar arms to exert a horizontal transverse force component on the vertically-oriented bolt through the rearwardly-directed yoke. Although the yaw axis at that vertically-oriented pin can accommodate transverse force components of the towed vehicle and the towbar arms, those transverse force components are imposed on the fore-to-aft oriented bolt through the rearwardly-directed and forwardly-directed yokes, and there is no other structure spaced forwardly therefrom that can provide another yaw axis to accommodate the transverse force components imposed on the fore-to-aft bolt through the rearwardly-directed and forwardly-directed yokes.

Similarly, in any operative situation where the towing vehicle enters an upgrade or a downgrade before the towed vehicle enters that grade change or the wheels of the towing vehicle are momentarily supported on a plane that is at a different elevation than the plane supporting the wheels of the towed vehicle, the towed vehicle causes the towbar arms to impose a vertical force component on the vertically-oriented bolt through the rearwardly-directed yoke of the Parent tow bar. Although the pitch axis at the horizontally-oriented bolt through the forwardly-directed yoke and the hitch member can accommodate such vertical force components imposed by the towed vehicle and the towbar arms, there is no other structure spaced forwardly therefrom that can provide another pitch axis to accommodate the vertical force components imposed on the horizontally-oriented bolt.

As a result of the foregoing, the moments which the Parent tow bar must internally oppose from force components imposed by the towed vehicle and the towbar arms can be described as follows:

(a) transverse force components create (i) moments in the rearwardly-directed yoke with the magnitude of the lever arm thereof being determined by the spacing between the vertically-oriented bolt through the rearwardly-directed yoke and the fore-to-aft oriented bolt through the rearwardly-directed and forwardly-directed yokes, (ii) moments in the forwardly-directed yoke with the magnitude of the lever arm thereof being determined by the spacing between the vertically-oriented bolt through the rearwardly-directed yoke and the horizontal pin through the forwardly-directed yoke, and (iii) moments in the hitch tube with the magnitude of the lever arm thereof being determined by the spacing between the vertically-oriented bolt through the rearwardly-directed yoke and the hitch member; and (b) vertical force components create moments in the hitch member with the magnitude of the lever arm thereof being determined by the spacing between the horizontally-oriented bolt through the forwardly-directed yoke and the hitch member.

Again, the various parts of the Parent tow bar could be constructed much more massively to enhance the strength thereof in an attempt to more capably withstand the moments created internally within that tow bar due to the spaced-apart structuring of the yaw, roll and pitch axes. And again, such over-construction would defeat the ability to provide a relatively light-weight, easily manageable tow bar having the structure disclosed by Parent.

A tow bar that has solved many of the problems of the Johnson and Parent tow bars is disclosed in U.S. Pat. No. 6,502,847 issued Jan. 7, 2003 to John Greaves. The Greaves tow bar includes a forwardly-extending hitching portion for connecting to a conventional receiver hitch fixedly connected to the rear of a towing vehicle. The equivalent of pitch, roll and yaw axes are all provided by a hitch ball member mounted in a hitch socket member with a rearwardly-directed hitch socket central aperture. The hitch ball member comprises two hemispheres, one spaced above the other in the hitch socket member. One of the hemispheres is fixedly attached to the forward end of one of the towbar arms, whereas the other hemisphere is fixedly attached to the forward end of the other towbar arm. The towbar arms extend rearwardly through the hitch socket central aperture. The hemispheres rotate relative to each other about a vertically-oriented axis when the towbar arms are spread apart to form a triangularly-shaped arrangement with the towed vehicle by use of two spaced-apart plate ball members fixedly connected to the rear ends of the towbar arms and connected to the front of the towed vehicle. Unfortunately, such relative rotation between the hemispheres, within the hitch socket member with the towbar arms fixedly attached thereto, reduces the remaining available spacing between the towbar arms and the periphery of the hitch socket central aperture thereby reducing the extent of relative movement available for accommodating pitch and yaw movements between the towing vehicle and the towed vehicle. Although special slots are provided in the hitch socket central aperture in order to enhance the movement available for relative yaw movements, a pitch movement occurring at the same time as a yaw movement that requires use of the special slots would defeat the intended purpose of the special slots.

An improvement provided by the Greaves tow bar over the Johnson and Parent tow bars is the substantial reduction in the number of moving parts that may be subject to failure during use. However, with one of the towbar arms being fixedly attached to a first one of the hemispheres and the other towbar arm being fixedly attached to the other hemisphere which is offset from the first hemisphere, an internal moment is operatively created between the two hemispheres.

Unfortunately, another drawback of the Greaves tow bar is the failure to provide a means for conveniently and rotatably storing the tow bar on the rear of the towing vehicle. Due to the towbar arms being fixedly connected to the hemispheres, due to the towbar arms extending rearwardly through the hitch socket central opening, and due to the limited ability to rotate the hemispheres thereby preventing the towbar arms from being displaced to an upright orientation, such convenient and rotatable storability does not appear to be possible without substantial structural modification to the Greaves tow bar, which is not taught or implied by the Greaves reference.

What is needed is a tow bar wherein the towbar arms thereof are not fixedly connected to hemispheres; wherein the towbar arms do not extend through a rearwardly-facing central opening in a manner that inhibits pitch and yaw movements between a towing vehicle and a towed vehicle; wherein the number of moving parts subject to failure during use is greatly reduced when a towed vehicle is being towed by a towing vehicle; wherein the connection between the towbar arms does not create a moment between the tow bar arms within a hitch socket member; and wherein the tow bar can be conveniently stored on the rear of a towing vehicle without having to disconnect the tow bar from the towing vehicle.

PRINCIPAL OBJECTS AND ADVANTAGES OF THE INVENTION

The principal objects and advantages of the present invention include: providing a tow bar having towbar arms that are not fixedly connected to hemispheres; providing such a tow bar wherein the towbar arms do not extend through a rearwardly-facing central opening in a manner that inhibits yaw and pitch movements between a towing vehicle and a towed vehicle; providing such a tow bar wherein the number of different parts that may be subject to failure during use is substantially reduced; providing such a tow bar wherein the number of moments created internally with the tow bar is substantially reduced; providing such a tow bar that can be conveniently stored on the rear of a towing vehicle without having to disconnect the tow bar from the towing vehicle; and generally providing such a tow bar that is reliable in performance, capable of long lasting life, and particularly well suited for the proposed usages thereof.

Other objects and advantages of this invention will become apparent from the following description taken in conjunction with the accompanying drawings wherein are set forth, by way of illustration and example, certain embodiments of this invention.

SUMMARY OF THE INVENTION

The improvements of the tow bar of the present invention include a towing vehicle connection mechanism for connecting to a towing vehicle, the towing vehicle connection mechanism including a hitching mechanism structured and configured to be received by a conventional receiver hitch of the towing vehicle, and defining a fore-to-aft oriented towing vehicle axis that is operatively fixed relative to the towing vehicle and to the towing vehicle connection mechanism. The tow bar of the present invention also includes a towed vehicle connection mechanism for connecting to a towed vehicle, the towed vehicle connection mechanism including at least one bracket attached to the towed vehicle, and defining a horizontal transversely-oriented towed vehicle axis that is operatively fixed relative to the towed vehicle and to the towed vehicle connection mechanism. The tow bar of the present invention further includes an interconnecting mechanism connecting the towing vehicle connection mechanism to the towed vehicle connection mechanism, the interconnecting mechanism defining an interconnection central point, defining an interconnection vertical axis spaced rearwardly from the interconnection central point, and including a spherically-shaped ball member having a radius and a ball member center point; a body member having a main cavity with a main cavity center point and a radius of curvature, which is slightly greater than the radius of the ball member; the body member further including an upper body portion with a downwardly-facing, partially hemispherically-shaped upper cavity having a radius of curvature, which is slightly greater than the radius of the ball member, and a center of curvature; a lower body portion with an upwardly-facing, partially hemispherically-shaped lower cavity having a radius of curvature, which is identical to the radius of curvature of the upper cavity of the upper body portion, and a center of curvature; and fastening means. Assembly of the upper body portion, the lower body portion and the ball member with the fastening means forms the main cavity of the body member wherein the center of curvature of the upper cavity of the upper body portion, the center of curvature of the lower cavity of the lower body portion, and the ball member center point all coincide with the main cavity center point, rotatively capturing the ball member therein. The upper body portion abuts the lower body portion along a plane that passes through the main cavity center point. The tow bar of the present invention also includes a slot cooperatively formed by the upper body portion in conjunction with the lower body portion, the slot having a slot width; a shaft member having a forward end affixed to the towing vehicle connection mechanism, a rearward end affixed to the ball member, and a diameter which is slightly smaller than the slot width, wherein the shaft member extends forwardly from the ball member through the slot; a rearwardly-projecting towbar arm connector affixed to the body member, and a pair of towbar arms, each having a forward end and a rear end, wherein the rear ends thereof are operatively spaced apart and connected to the towed vehicle connection mechanism, and the forward ends thereof are not spaced apart and are movably connected to the towbar arm connector to pivot about the interconnection vertical axis; and a latching mechanism structured and configured to secure the interconnecting mechanism in a stowed configuration, the latching mechanism comprising a first latching device connected to the towbar arm connector, and a second latching device affixed to the towing vehicle connection mechanism. The body member is rotated about the ball member to displace the slot along the shaft member to dispose the towbar arm connector in a generally upright orientation, the first latching device in conjunction with the second latching device releasably securing the interconnecting mechanism in the stowed configuration.

A modified embodiment of the improved tow bar of the present invention includes a towing vehicle connection mechanism; a towed vehicle connection mechanism; and an interconnecting mechanism connecting the towing vehicle connection mechanism to the towed vehicle connection mechanism. The interconnecting mechanism includes a spherically-shaped ball member and a body member comprising a first body portion having a rearwardly-facing, partially hemispherically-shaped first cavity with a radius of curvature, which is slightly greater than the radius of the ball member, and a center of curvature; a second body portion with a forwardly-facing, partially hemispherically-shaped second cavity with a radius of curvature, which is identical to the radius of curvature of the first cavity of the first body portion, and a center of curvature; and a third body portion with a forwardly-facing, partially hemispherically-shaped third cavity with a radius of curvature, which is identical to the radius of curvature of the second cavity of the second body portion, and a center of curvature; and fastening means. Assembly of the first body portion, the second body portion, the third body portion and the ball member with the fastening means forms the main cavity of the body member wherein the center of curvature of the first cavity of the first body portion, the center of curvature of the second cavity of the second body portion, the center of curvature of the third cavity of the third body portion, and the ball member center point all coincide, rotatively capturing the ball member therein. The modified embodiment further includes a slot having a slot width, the slot being cooperatively formed between the second and third body portions by assembly of the body member; a shaft member having a diameter which is slightly smaller that the slot width, a forward end thereof affixed to the ball member, and a rearward end thereof extending rearwardly through the slot; a towbar arm connector affixed to the shaft member; and a pair of towbar arms, each having a forward end and a rear end, wherein the rear ends thereof are operatively spaced apart and connected to the towed vehicle connection mechanism, and the forward ends thereof are not spaced apart and are movably connected to the towbar arm connector to pivot about the interconnection vertical axis; and a latching mechanism structured and configured to secure the interconnecting mechanism in a stowed configuration, the latching mechanism including a first latching device affixed to the ball member and a second latching device affixed to the body member. As the ball member is selectively rotated within the body member to displace the shaft member along the slot to thereby dispose the shaft member in a generally upright orientation, the first latching device in conjunction with the second latching device releasably secures the interconnecting mechanism in the stowed configuration.

BRIEF DESCRIPTION OF THE DRAWING FIGURES

FIG. 12 is an enlarged and fragmentary, partially cross-sectional exploded top plan view of a reinforced version of a ball member of the modified embodiment of the tow bar of the present invention.

FIG. 13 is a rear elevation view showing the modified embodiment of the tow bar of the present invention in a stowed configuration.

DETAILED DESCRIPTION OF THE INVENTION

Figure 1:
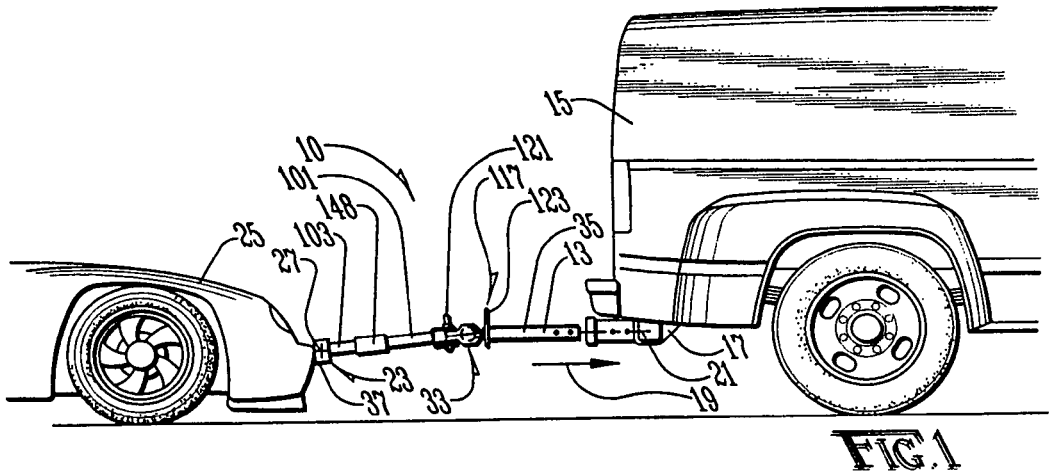
FIG. 1 is a side elevational view of a tow bar having a single moving part for operatively accommodating pitch and roll movements between a towing vehicle and a towed vehicle, according to the present invention.
Figure 2:
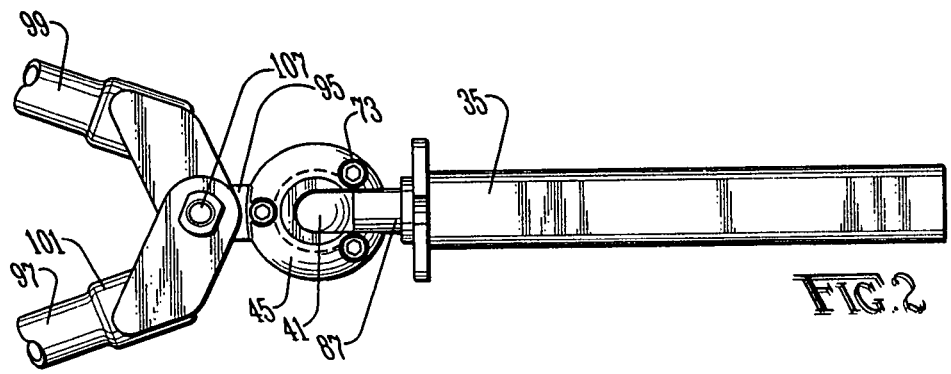
FIG. 2 is an enlarged and fragmentary, top plan view of the tow bar of the present invention.
Figure 3:
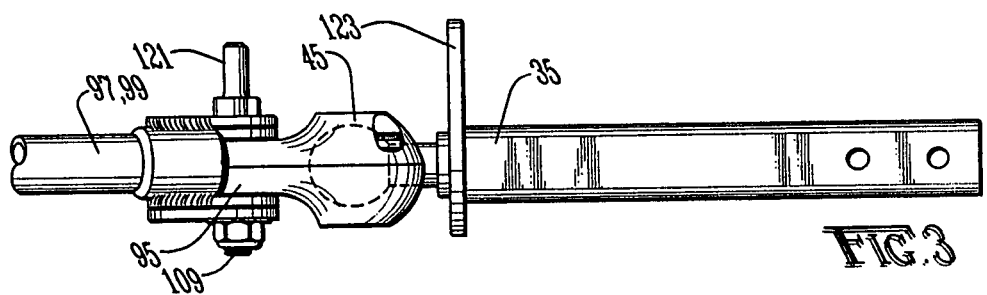
FIG. 3 is an enlarged and fragmentary, side elevational view of the tow bar of the present invention, showing first and second latching devices of a latching mechanism thereof.
Figure 4:
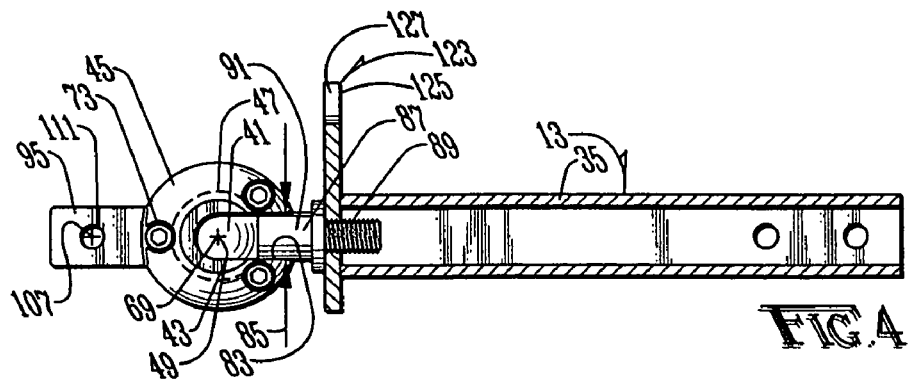
FIG. 4 is a further enlarged and fragmentary, partially cross-sectional view of the tow bar of the present invention, showing a body member thereof rotated sidewise.

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a tow bar for connecting a towed vehicle to a towing vehicle in accordance with the present invention, as shown in FIGS. 1 through 8. The present invention 10 includes a towing vehicle connection mechanism 13 for connecting the tow bar 10 to a towing vehicle 15, the towing vehicle connection mechanism 13, upon insertion and securement in a conventional receiver hitch 17 of the towing vehicle 15, as indicated by an arrow designated by numeral 19 in FIG. 1, operatively defining a fore-to-aft towing vehicle axis 21 that is fixed relative to the towing vehicle 15 and to the towing vehicle connection mechanism 13; a towed vehicle connection mechanism 23 for connecting the tow bar 10 to a vehicle to be towed by the towing vehicle 15, sometimes referred to herein as the towed vehicle 25, the towed vehicle connection mechanism 23 operatively defining a horizontal transversely-oriented towed vehicle axis 27 that is fixed relative to the towed vehicle 25 and to the towed vehicle connection mechanism 23; and an interconnecting mechanism 33 connecting the towing vehicle connection mechanism 13 to the towed vehicle connection mechanism 23.

The towing vehicle connection mechanism 13 includes a forwardly-extending hitching mechanism 35 that is structured and configured to be received by the conventional receiver hitch 17 fixedly mounted at the rear of the towing vehicle 15.

The towed vehicle connection mechanism 23 includes one or more brackets 37 connected to the towed vehicle 25, or other suitable means, such as a baseplate connector as commonly known in the art, or such as those disclosed in U.S. Pat. No. 5,224,960 issued Jul. 6, 1993 to Lee H. Duncan and in U.S. Pat. No. 5,356,166 issued Oct. 18, 1994 to Merton K. Hahne et all, both of which disclosures are incorporated herein by reference.

The interconnecting mechanism 33 includes a spherically-shaped member 41, having a two-inch diameter for example, sometimes referred to herein as a ball member 41, which has a radius and a ball member center point 43 at the center of curvature of the ball member 41.

The interconnecting mechanism 33 also includes a body member 45. The body member 45 includes a main cavity 47 having a main cavity center point 49 located at the center of curvature 49 of the main cavity 47. The radius of curvature of the main cavity 47 is slightly greater than the radius of the ball member 41. A preferred embodiment of the present invention includes the body member 45 having an upper body portion 53 with a downwardly-facing, partially hemispherically-shaped upper cavity 55 with a radius of curvature, which is slightly greater than the radius of the ball member 41, and a center of curvature 57; and a lower body portion 63 with an upwardly-facing, partially hemispherically-shaped lower cavity 65 with a radius of curvature, which is identical to the radius of curvature of the upper cavity 55 of the upper body portion 53, and a center of curvature 67.

The main cavity 47 is structured and dimensioned to rotatively capture the ball member 41 therein, as described herein, such that each of the ball member center point 43, the center of curvature 57 of the upper body portion 53, and the center of curvature 67 of the lower body portion 63 coincides with the main cavity center point 49 of the main cavity 47, sometimes referred to herein as the interconnection central point 69.

Figure 5:
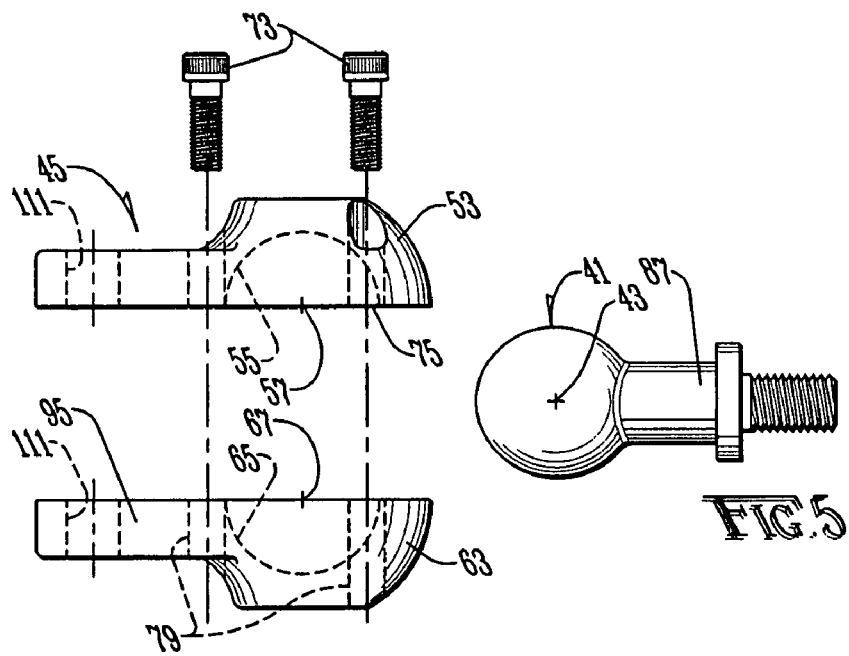
FIG. 5 is an enlarged and fragmentary, exploded side elevational view of a ball member and the body member of the tow bar of the present invention.

The interconnecting mechanism 33 also includes fastening means 73, such as a plurality of cap screws 73 as shown in FIG. 5, to assemble the body member 45 from the upper body portion 53 and the lower body portion 63. Assembly of the upper body portion 53, the lower body portion 63 and the ball member 41 with the fastening means 73 brings together the upper and lower cavities 55, 65 of the upper and lower body portions 53, 63 to cooperatively form the main cavity 47 for rotatively capturing the ball member 41 therein. Preferably, after assembly, the upper body portion 53 and the lower body portion 63 abuttingly engage each other along a plane 75 that passes through the main cavity center point 49 of the main cavity 47 formed by the upper and lower cavities 55, 65.

During assembly, the upper body portion 53 and the lower body portions 63 are securely fastened together with the fastening means 73, such as by threading vertically-oriented cap bolts 73 into mated tapped partial bores 79 as indicated in FIG. 5, or other suitable fastening arrangement.

The interconnecting mechanism 33 also includes a slot 83 having a slot width 85 and a shaft member 87 having a forward end 89 and a rearward end 91. The slot 83 is cooperatively formed during assembly by the upper body portion 53 in conjunction with the lower body portion 63. The shaft member 87 has a diameter that is dimensioned slightly smaller than the slot width 85. The forward end 89 of the shaft member 87 is affixed to the towing vehicle connection mechanism 13 and the rearward end 91 of the shaft member 87 is affixed to the ball member 41, with the shaft member 87 extending forwardly from the ball member 41 through the slot 83.

The interconnecting mechanism 33 also includes a rearwardly-projecting towbar arm connector 95 affixed to the body member 45, and at least one, preferably two, towbar arms 97, 99. Each towbar arm 97, 99 has a forward end 101 and a rear end 103. The rear ends 103 of the towbar arms 97, 99 are operatively spaced apart from each other for connection to the towed vehicle connection mechanism 23. The forward ends 101 of the towbar arms 97, 99 are not spaced apart from each other and are movably connected to the towbar arm connector 95 to pivot about an interconnection vertical axis 107.

The interconnection vertical axis 107 is provided by a pin 109 through a vertically-oriented throughbore 111 in the towbar arm connector 95, as shown in FIG. 5, or other suitable arrangement. The towbar arms 97, 99 are independently movable relative to each other for purposes of connecting the towbar arms 97, 99 to the towed vehicle connection mechanism 23. Operatively, however, the towbar arms 97, 99 move in unison to accommodate yaw movements between the towing vehicle 15 and the towed vehicle 25.

Figure 6:
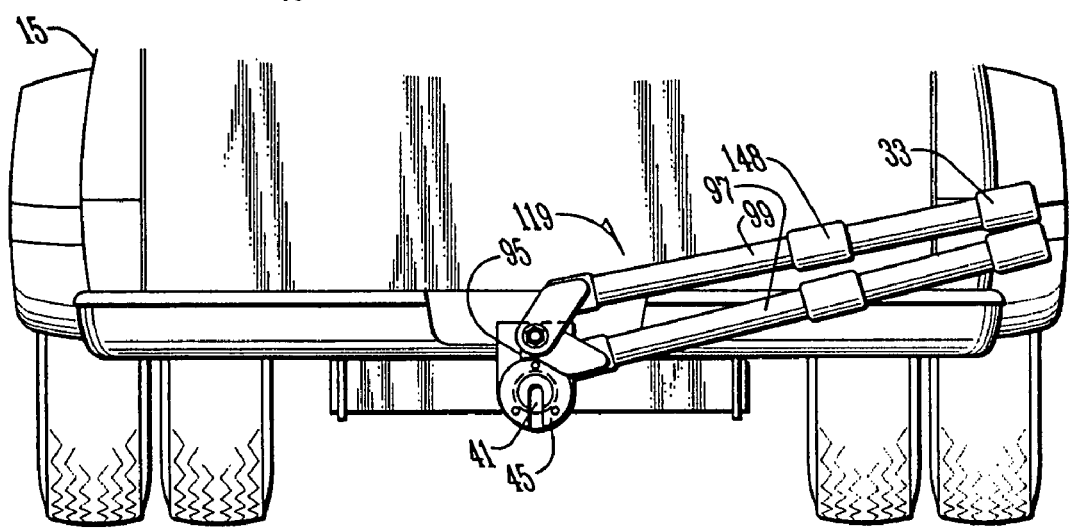
FIG. 6 is a rear elevational view showing the tow bar of the present invention in a stowed configuration.

The interconnecting mechanism 33 also includes a latching mechanism 117 which is structured and configured to secure the interconnecting mechanism 33 in a stowed configuration 119, as shown in FIG. 6. The latching mechanism 117 includes a first latching device 121 connected to the towbar arm connector 95, and a second latching device 123 affixed to the towing vehicle connection mechanism 13.

The latching mechanism 117 is structured and configured wherein the body member 45 can be rotated about the ball member 41 to displace the slot 83 along the shaft member 87 to thereby dispose the towbar arm connector 95 in a generally upright configuration. Then, by tilting the towbar arm connector 95 to the right or left, the first latching device 121 engages one of the ends 125 of an oblong notch 127 of the second latching device 123, the first latching device 121 in conjunction with the second latching device 123 thereby releasably securing the interconnection mechanism 33 in the stowed configuration 119 on the back of the towing vehicle 15. If necessary, the width of the slot 83 may be enlarged near an upper end thereof in order to permit the first latching device 121 to fully engage an appropriate end 125 of the oblong notch 127 of the second latching device 123.

It should now be obvious from the disclosure herein that the interconnecting mechanism 33 is configured and structured to accommodate substantially all pitch and roll movements, including any and all combinations thereof, between the towing vehicle axis 21 and the towed vehicle axis 27, at and about the interconnection central point 69. The interconnecting mechanism 33 is further configured and structured to accommodate substantially all yaw movements, between the towing vehicle axis 21 and the towed vehicle axis 27, at and about the interconnection vertical axis 107 in the towbar arm connector 95.

It should be noted that the pitch and roll movements between the fore-to-aft towing vehicle axis 21 and the horizontal transversely-oriented towed vehicle axis 27 while the towed vehicle 25 is being towed by the towing vehicle 15 are effectively accommodated by a single moving part: the ball member 41 within the body member 45; in other words at the coincidence of the main cavity center point 49 and the ball member center point 43.

The only moments created internally within the tow bar 10 of the present invention arise solely from yaw movements between the towing vehicle 15 and the towed vehicle 25, which only operatively occur when the towed vehicle 25 is not lined up longitudinally with the towing vehicle 15. The magnitude of the lever arm of those yaw moments is determined by the spacing between the interconnection vertical axis 107 and the hitching mechanism 35. Due to the simplicity of the structure of the tow bar 10 of the present invention, the magnitude of the lever arm of those yaw moments can be minimized by minimizing the spacing between the interconnection vertical axis 107 and the hitching mechanism 35. In other words, the structure of the tow bar 10 of the present invention has substantially reduced the number of moving parts and has also substantially reduced the various internally-created moments observed for prior art tow bars.

Figure 7:
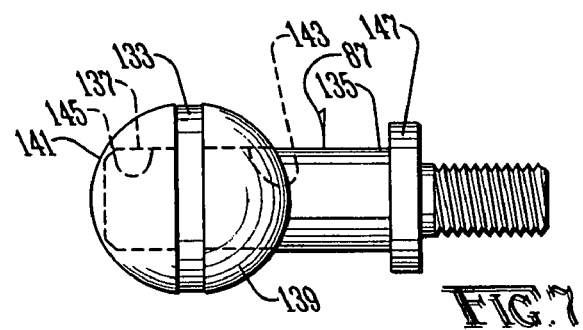
FIG. 7 is an enlarged side elevational view of a reinforced version of the ball member of the tow bar of the present invention.
Figure 8:
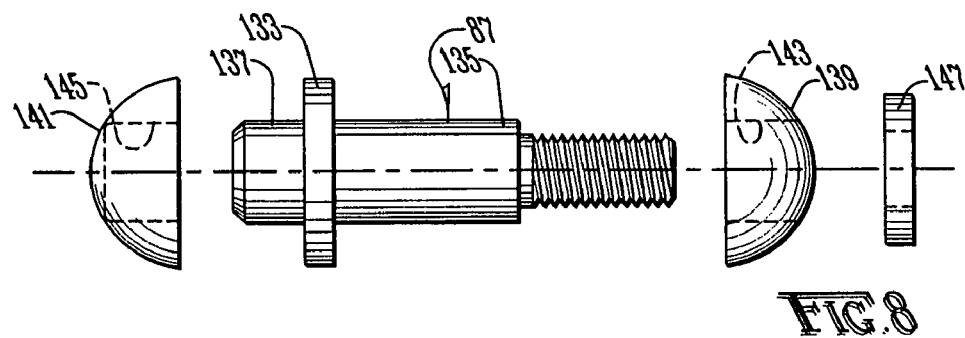
FIG. 8 is an exploded view of FIG. 7 of the reinforced version of the ball member of the tow bar of the present invention.
Figure 9:
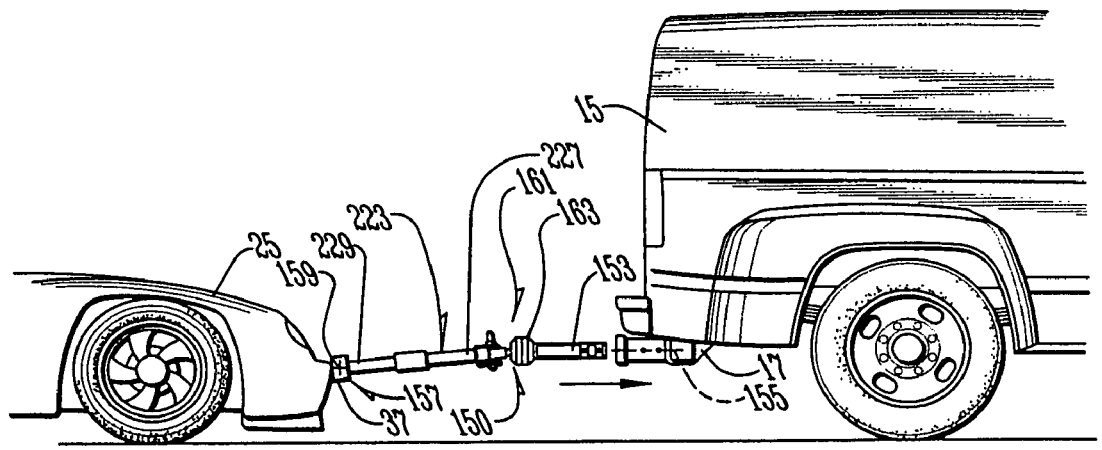
FIG. 9 is a side elevational view of a modified embodiment of the tow bar having a single moving part for operatively accommodating pitch and roll movements between a towing vehicle and a towed vehicle, according to the present invention.

For most applications, various components of the tow bar 10 of the present invention are constructed of strong, high tensile-strength materials such as steel, brass, or other suitable materials. For some applications, it may be desirable to construct the ball member 41 of low tensile-strength material, such as teflon for example. In that event, the shaft member 87 includes a circularly-shaped disc 133 rigidly affixed to and separating the shaft member 87 into a distal end 135 and a proximal end 137, as shown in FIGS. 7 and 8. In addition, the ball member 41 comprises a distal portion 139 and a proximal portion 141. The distal portion 139 of the ball member 41 has a throughbore 143 with a diameter which is dimensioned to fit snugly about the distal end 135 of the shaft member 87. The proximal portion 141 of the ball member 41 has a partial bore or throughbore 145 with a diameter which is dimensioned to fit snugly about the proximal end 137 of the shaft member 87. The distal and proximal portions 139, 141 of the ball member 41, and the location and thickness of the disc 133 relative to the distal and proximal ends 135, 137 of the shaft member 87, when assembled as shown in FIG. 7, provide the spherically-shaped ball member 41 as hereinbefore described and as shown in FIG. 5. If desired, a washer 147 around the distal end 135 of the shaft member 87 may be used to provide a broader support base for the shaft member. It is generally unnecessary to bond the distal and proximal portions 139, 141 of the ball member 41 to the shaft member 87 because assembly of the body member 45 with the ball member 41 thereinside as hereinbefore described, the ball member 41 being assembled as shown in FIG. 7, operatively captures and retains the desired spherical shape of the ball member 41 without bonding.

It may be desirable to minimize exposure of the ball member 41 to debris and various other adverse elements of the environment by providing a flexible, corrugated boot to cover the various potential accesses to the main cavity 47.

It may also be desirable to include a mechanism 148 in each towbar arm 97, 99 that allows the length of the respective towbar arm 97, 99 to be selectively changed to simplify connecting the tow bar 10 to the towed vehicle 25, wherein each of the towbar arms 95, 97 automatically returns to a selected towing length by simply driving the towing vehicle 15 forward after the tow bar 10 has been connected to the towing vehicle 15 and to the towed vehicle 25. Another benefit provided by the mechanisms 148 is the ability to shorten the reach of the towbar arms 97, 99 when the tow bar 10 has been placed in the stowed configuration 119 on the back of the towing vehicle 15. Examples of such mechanisms 148 are disclosed in U.S. Pat. No. 5,224,960 issued Jul. 6, 1993 to Lee H. Duncan and in U.S. Pat. No. 5,356,166 issued Oct. 18, 1994 to Merton K. Hahne et al, each of which disclosures are incorporated herein by reference.

In an application of embodiment 10 of the present invention, the hitching mechanism 35 is inserted and secured in the conventional receiver hitch 17 of the towing vehicle 15. If the tow bar 10 has been previously secured to the towing vehicle 15 and is in the stowed configuration 119, then the tow bar arms 97, 99 are grasped and maneuvered to disengage the latching mechanism 117, to rotate the body member 45 about the ball member 41 to thereby displace the towbar arms 97, 99 rearwardly toward the towed vehicle 25, and to secure the towed vehicle connection mechanism 23 to the towed vehicle 25. Of course, an application of the tow bar 10 would also involve the proper use of safety chains, electrical hookups, etc., as commonly known in the art.

Conversely, if the towed vehicle 25 is to be temporarily disconnected from the towing vehicle 15, the towed vehicle connection mechanism 23 is disconnected from the towed vehicle 25; the tow bar arms 97, 99 are used to rotate the body member 45 about the ball member 42 to thereby displace the towbar arms 97, 99 to a generally upright orientation, and the latching mechanism 117 is tilted sidewise to engage the latching mechanism 117 to thereby releasably secure the tow bar 10 in the stowed configuration 119 on the back of the towing vehicle 15. If it is desired to disconnect both the towed vehicle 25 and the tow bar 10 from the towing vehicle 15, the towed vehicle connection mechanism 23 is disconnected from the towed vehicle 25 and the hitching mechanism 35 is unsecured and withdrawn from the conventional receiver hitch 17 of the towing vehicle 15. If it is desired to store the tow bar 10 in the stowed configuration 119, the tow bar 10 is usually returned to the stowed configuration 119 before removing the hitching mechanism 35 from the conventional receiver hitch 17 of the towing vehicle 15.

The reference numeral 150 generally refers to a modified embodiment of the tow bar for connecting a towed vehicle 25 to a towing vehicle 15 in accordance with the present invention, as shown in FIGS. 9 through 13. Many of the details of the modified embodiment 150 are substantially similar to those hereinbefore described for embodiment 10 and will not be reiterated here.

The modified embodiment 150 includes a towing vehicle connection mechanism 153 for connecting the tow bar 150 to a towing vehicle 15, the towing vehicle connection mechanism 153, upon insertion and securement in the conventional receiver hitch 17 of the towing vehicle 15 operatively defining a fore-to-aft towing vehicle axis 155 that is fixed relative to the towing vehicle 15 and to the towing vehicle connection mechanism 153; a towed vehicle connection mechanism 157 for connecting the tow bar 150 to the towed vehicle 25, the towed vehicle connection mechanism 157 operatively defining a horizontal transversely-oriented towed vehicle axis 159 that is fixed relative to the towed vehicle 25 and to the towed vehicle connection mechanism 157; and an interconnecting mechanism 161 connecting the towing vehicle connection mechanism 153 to the towed vehicle connection mechanism 157.

The modified embodiment 150 of the present invention includes a body member 163 having a first body portion 165 with a rearwardly-facing, partially hemispherically-shaped first cavity 167 and having a radius of curvature, which is slightly greater than the radius of a ball member 169 having a ball member center point 170, and a center of curvature 171; a second body portion 173 with a forwardly-facing, partially hemispherically-shaped second cavity 175 having a radius of curvature, which is identical to the radius of curvature of the first cavity 167 of the first body portion 165, and a center of curvature 177; and a third body portion 179 having a forwardly-facing, partially hemispherically-shaped third cavity 181 having a radius of curvature, which is identical to the radius of curvature of the second cavity 175 of the second body portion 173, and a center of curvature 183. For some applications, it may be desirable that the second and third body portions 173, 179 have a unitary construction, i.e., constructed from a single piece of material.

Figure 10:
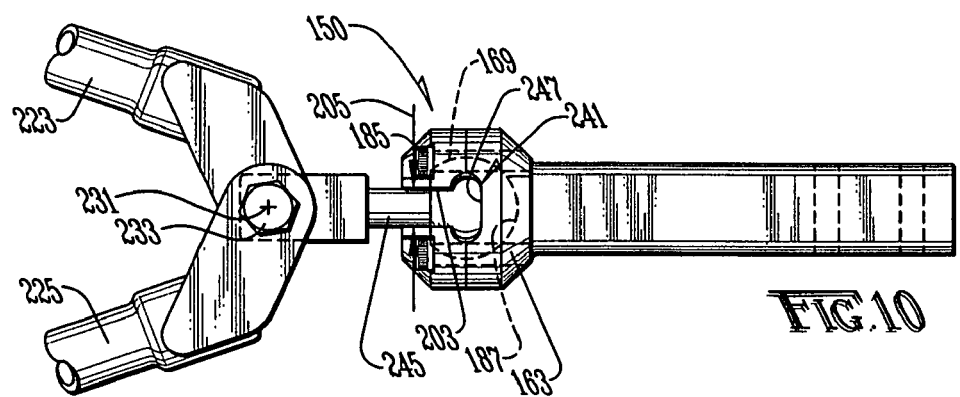
FIG. 10 is an enlarged and fragmentary, top plan view of the modified embodiment of the tow bar of the present invention.

The interconnecting mechanism 161 also includes fastening means 185, such as a plurality of cap screws 185 as shown in FIG. 10. Assembly of the first body portion 165, the second body portion 173, and the third body portion 179 with the fastening means 185 forms a main cavity 187 having a main cavity center point 189, sometimes referred to herein as the interconnection central point 191, to rotatively capture the ball member 169 therein, wherein the center of curvature 171 of the first cavity 167 of the first body portion 165, the center of curvature 177 of the second cavity 175 of the second body portion 173, the center of curvature 183 of the third cavity 181 of the third body portion 179, and the ball member center point 170 all coincide with the interconnection central point 191 to rotatively capture the ball member 169 therein. Preferably, the second body portion 173 and the third body portion 179 abut the first body portion 165 along a plane 201 that passes through the interconnection central point 191.

The interconnecting mechanism 161 also includes a slot 203, having a slot width 205, and a shaft member 207, having a forward end 209 and a rearward end 211. The slot 203 is cooperatively formed between the second body portion 173 and the third body portion 179 during assembly of the body member 163. The shaft member 207 has a diameter that is slightly smaller than the slot width 205. The forward end 209 of the shaft member 207 is affixed to the ball member 169 and the rearward end 211 of the shaft member 207 extends rearwardly from the ball member 169 through the slot 203.

Figure 11:
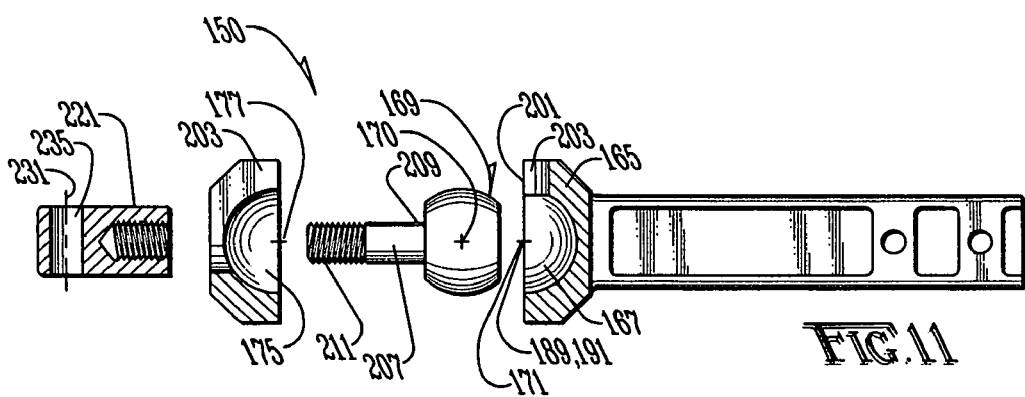
FIG. 11 is an enlarged and fragmentary, partially cross-sectional, exploded side elevational view of the modified embodiment of the tow bar of the present invention.

The interconnecting mechanism 161 also includes a towbar arm connector 221 affixed to the rearward end 211 of the shaft member 207, and at least one, preferably two, towbar arms 223, 225. Each towbar arm 223, 225 has a forward end 227 and a rear end 229. The forward ends 227 of the towbar arms 223, 225 are not spaced apart from each other and are individually movably connected to the towbar arm connector 221 to pivot about an interconnection vertical axis 231 provided by a pin 233 through a vertically-oriented throughbore 235 in the towbar arm connector 221, as shown in FIGS. 10 and 11, or other suitable arrangement.

The interconnecting mechanism 161 also includes a latching mechanism 241 which is structured and configured to secure the interconnecting mechanism 161 in a stowed configuration 243. The latching mechanism 241 may include the shaft member 207 serving as a first latching device 245 with the latching mechanism 241 also including a second latching device 247 affixed to the body member 163. The second latching mechanism 247 can be described as an enlargement of the width of slot 203 near an upward end thereof, as shown in FIG. 10, in order to permit the first latching device 245 to appropriately engage the second latching device 247.

The latching mechanism 241 is structured and configured wherein the ball member 169 can be selectively rotated within the body member 163 to displace the shaft member 207 along the slot 203 to thereby dispose the shaft member 207 in a generally upright orientation. Then, by tilting the shaft member 207 to the right or left, the first latching device 245 engages the second latching device 247 thereby releasably securing the interconnecting mechanism 161 in the stowed configuration 243 on the back of the towing vehicle 15.

Again, for some applications, it may be desirable to construct the ball member 169 of low tensile-strength material, such as teflon for example. In that event, the shaft member 207 includes a circularly-shaped disc 263 rigidly affixed to and separating the shaft member 207 into a distal end 265 and a proximal end 267, as shown in FIG. 12. In addition, the ball member 169 comprises a distal portion 269 and a proximal portion 271. The distal portion 269 of the ball member 169 has a throughbore 273 with a diameter which is dimensioned to fit snugly about the distal end 265 of the shaft member 207. The proximal portion 271 of the ball member 169 has a partial bore or throughbore 275 with a diameter which is dimensioned to fit snugly about the proximal end 267 of the shaft member 207. The distal and proximal portions 269, 271 of the ball member 169, and the location and thickness of the disc 263 relative to the distal and proximal ends 265, 267 of the shaft member 207, when assembled provide the spherically-shaped ball member 169 as hereinbefore described. It is generally unnecessary to bond the distal and proximal portions 269, 271 of the ball member 169 to the shaft member 207 because assembly of the body member 163 with the ball member 169 thereinside, as hereinbefore described, captures and retains the desired spherical shape of the ball member 169 without bonding.

An application of the modified embodiment 150 of the present invention is substantially similar to the above described description for an application of embodiment 10 of the present invention with an exception being that converting the modified tow bar 150 to the stowed configuration 243 causes the ball member 169 to be selectively rotated within the body member 163, as opposed to rotating the body member 45 about the ball member 41 as described for embodiment 10.

It is to be understood that while certain forms of the present invention have been illustrated and described herein, it is not to be limited to the specific forms or arrangement of parts described and shown.

What is claimed and desired to be covered by Letters Patent is as follows:

1. A tow bar for connecting a towed vehicle to a towing vehicle, the tow bar comprising:
   (a) a towing vehicle connection mechanism connected to the towing vehicle, the towing vehicle connection mechanism defining a fore-to-aft oriented towing vehicle axis that is operatively fixed relative to the towing vehicle and to the towing vehicle connection mechanism;
   (b) a towed vehicle connection mechanism connected to the towed vehicle, the towed vehicle connection mechanism defining a horizontal transversely-oriented towed vehicle axis that is operatively fixed relative to the towed vehicle and to the towed vehicle connection mechanism; and
   (c) an interconnecting mechanism connecting the towing vehicle connection mechanism to the towed vehicle connection mechanism, the interconnecting mechanism defining:
      (1) an interconnection central point, and
      (2) an interconnection vertical axis spaced rearwardly from the interconnection central point; and wherein the interconnecting mechanism includes:
      (3) a spherically-shaped ball member having a radius and a ball member center point; and
      (4) a body member having a main cavity with a main cavity center point and a radius of curvature, which is slightly greater than the radius of the ball member, and
      (5) wherein the ball member is rotatively captured within the body member with the ball member center point and the main cavity center point coinciding with the interconnection central point; and wherein the body member includes:
         (A) a first body portion having a rearwardly-facing, partially hemispherically-shaped first cavity with a radius of curvature, which is slightly greater than the radius of the ball member, and a center of curvature;
         (B) a second body portion having a forwardly-facing, partially hemispherically-shaped second cavity with a radius of curvature, which is identical to the radius of curvature of the first cavity of the first body portion, and a center of curvature;
         (C) a third body portion having a forwardly-facing, partially hemispherically-shaped third cavity with a radius of curvature, which is identical to the radius of curvature of the second cavity of the second body portion, and a center of curvature; and
         (D) fastening means; and
         (E) wherein assembly of the first body portion, the second body portion, the third body portion and the ball member with the fastening means forms the main cavity wherein the center of curvature of the first cavity of the first body portion, the center of curvature of the second cavity of the second body portion, the center of curvature of the third cavity of the third body portion and the ball member center point all coincide with the main cavity center point, rotatively capturing the ball member therein; and
   (d) wherein the interconnecting mechanism is configured and structured to accommodate substantially all pitch and roll movements, including any and all combinations thereof, between the towing vehicle axis and the towed vehicle axis, at and about the interconnection central point; and wherein the interconnecting mechanism is further configured and structured to accommodate substantially all yaw movements, between the towing vehicle axis and the towed vehicle axis, at and about the interconnection vertical axis.

2. The tow bar as described in claim 1 wherein, wherein the second and third body portions are of unitary construction.

3. The tow bar as described in claim 1 wherein, after assembly of the body member with the fastening means, the second and third body portions abut the first body portion along a plane that passes through the interconnection central point.

4. The tow bar as described in claim 1 wherein the interconnecting mechanism further includes:
   (a) a slot having a slot width, the slot being cooperatively formed between the second and third body portions by assembly of the body member; and
   (b) a shaft member having a forward end, a rearward end and a diameter, which is slightly smaller than the slot width, the forward end thereof being affixed to the ball member and the rearward end thereof extending rearwardly through the slot.

5. The tow bar as described in claim 4, wherein
   (a) the shaft member includes a transversely-oriented disc which separates the shaft member into a proximal end and a distal end; and
   (b) the ball member comprises
      (1) a proximal portion having a partial bore or throughbore having a diameter dimensioned to fit snugly around the proximal end of the shaft member, and
      (2) a distal portion having a throughbore having a diameter dimensioned to fit snugly around the distal end of the shaft member; and
   (c) wherein the spherical shape of the ball member is provided by assembly of the proximal portion of the ball member onto the proximal end of the shaft member and by assembly of the distal portion of the ball member onto the proximal end of the shaft member with the transversely-oriented disc sandwiched between the proximal and distal portions of the ball member.

6. The tow bar as described in claim 4 wherein the interconnecting mechanism further includes:
   (a) a towbar arm connector affixed to the shaft member; and
   (b) at least one towbar arm having a forward end and a rear end, the forward end thereof being pivotally connected to the towbar arm connector to pivot about the interconnection vertical axis and the rear end thereof being connected to the towed vehicle connection mechanism.

7. The tow bar as described in claim 6 wherein the at least one towbar arm includes two towbar arms, each having a forward end and a rear end, wherein the rear ends thereof are operatively spaced apart and connected to the towed vehicle connection mechanism and wherein the forward ends thereof are not spaced apart and are pivotally connected to the towbar arm connector to pivot about the interconnection vertical axis.

8. The tow bar as described in claim 7, wherein the forward ends of the two towbar arms can pivot separately or in unison about the interconnection vertical axis.

9. The tow bar as described in claim 4, further comprising:
   (a) a latching mechanism structured and configured to secure the interconnecting mechanism in a stowed configuration, the latching mechanism including:
      (1) a first latching device affixed to the ball member, and
      (2) a second latching device affixed to the body member; and
   (b) wherein, as the ball member is rotated within the body member to displace the shaft member to a generally upright orientation, the first latching device in conjunction with the second latching device releasably secures the interconnecting mechanism in the stowed configuration.

10. A tow bar for connecting a towed vehicle to a towing vehicle, the tow bar comprising:
   (a) a towing vehicle connection mechanism connected to the towing vehicle, the towing vehicle connection mechanism
      (1) including a hitching mechanism structured and configured to be received by a conventional receiver hitch of the towing vehicle, and
      (2) defining a fore-to-aft oriented towing vehicle axis that is operatively fixed relative to the towing vehicle and to the towing vehicle connection mechanism;
   (b) a towed vehicle connection mechanism connected to the towed vehicle, the towed vehicle connection mechanism
      (1) including at least one bracket attached to the towed vehicle, and
      (2) defining a horizontal transversely-oriented towed vehicle axis that is operatively fixed relative to the towed vehicle and to the towed vehicle connection mechanism;
   (c) an interconnecting mechanism connecting the towing vehicle connection mechanism to the towed vehicle connection mechanism, the interconnecting mechanism defining an interconnection central point, defining an interconnection vertical axis spaced rearwardly from the interconnection central point, and including:
      (1) a spherically-shaped ball member having a radius and a ball member center point,
      (2) a body member having a main cavity with a main cavity center point and a radius of curvature, which is slightly greater than the radius of the ball member, the body member further including:
         (A) a first body portion having a rearwardly-facing, partially hemispherically-shaped first cavity with a radius of curvature, which is slightly greater than the radius of the ball member, and a center of curvature,
         (B) a second body portion with a forwardly-facing, partially hemispherically-shaped second cavity with a radius of curvature, which is identical to the radius of curvature of the first cavity of the first body portion, and a center of curvature, and
         (C) a third body portion with a forwardly-facing, partially hemispherically-shaped third cavity with a radius of curvature, which is identical to the radius of curvature of the second cavity of the second body portion, and a center of curvature, and
         (D) fastening means, and
         (E) wherein assembly of the first body portion, the second body portion, the third body portion and the ball member with the fastening means forms the main cavity of the body member wherein the center of curvature of the first cavity of the first body portion, the center of curvature of the second cavity of the second body portion, the center of curvature of the third cavity of the third body portion, and the ball member center point all coincide with the main cavity center point, rotatively capturing the ball member therein; and wherein the second and third body portions abut the first body portion along a plane that passes through the main cavity center point, (3) a slot having a slot width, the slot being cooperatively formed between the second and third body portions by assembly of the body member, (4) a shaft member having a forward end, a rearward end and a diameter which is slightly smaller that the slot width, the forward end thereof being affixed to the ball member, and the rearward end thereof extending rearwardly through the slot, (5) a towbar arm connector affixed to the shaft member, and (6) a pair of towbar arms, each having a forward end and a rear end, wherein the rear ends thereof are operatively spaced apart and connected to the towed vehicle connection mechanism, and the forward ends thereof are not spaced apart and are movably connected to the towbar arm connector to pivot about the interconnection vertical axis; and (d) a latching mechanism structured and configured to secure the interconnecting mechanism in a stowed configuration, the latching mechanism including:

(1) a first latching device affixed to the ball member, and (2) a second latching device affixed to the body member, and (3) wherein, as the ball member is rotated within the body member to displace the shaft member along the slot to thereby dispose the shaft member in a generally upright orientation, the first latching device in conjunction with the second latching device releasably secures the interconnecting mechanism in the stowed configuration; and (e) wherein the interconnecting mechanism is configured and structured to accommodate substantially all pitch and roll movements including any and all combinations thereof, between the towing vehicle axis and the towed vehicle axis, at and about the interconnection central point; and wherein the interconnecting mechanism is further configured and structured to accommodate substantially all yaw movements, between the towing vehicle axis and the towed vehicle axis, at and about the interconnection vertical axis.

* * * * *